US007308746B2

(12) United States Patent
Haines, Jr.

(10) Patent No.: US 7,308,746 B2
(45) Date of Patent: Dec. 18, 2007

(54) FASTENER REMOVAL APPARATUS AND ASSOCIATED METHOD

(75) Inventor: Donald W. Haines, Jr., Waco, TX (US)

(73) Assignee: Huck International, Inc., Tuscon, AZ (US)

( * ) Notice: Subject to any disclaimer, the term of this patent is extended or adjusted under 35 U.S.C. 154(b) by 243 days.

(21) Appl. No.: 11/239,913

(22) Filed: Sep. 30, 2005

(65) Prior Publication Data

US 2006/0021207 A1 Feb. 2, 2006

Related U.S. Application Data

(62) Division of application No. 10/654,373, filed on Sep. 3, 2003, now Pat. No. 7,059,216.

(51) Int. Cl.
*B23P 19/02* (2006.01)

(52) U.S. Cl. .................................................... 29/426.4

(58) Field of Classification Search ............... 29/426.4, 29/426.1, 700, 235, 240, 426.5; 81/436, 81/464, 465, 55, 13; 30/272.1, 156, 388–390
See application file for complete search history.

(56) References Cited

U.S. PATENT DOCUMENTS

| | | | | |
|---|---|---|---|---|
| 962,483 | A | | 6/1910 | Whisler |
| 1,297,075 | A | | 3/1919 | Braley |
| 2,531,049 | A | | 11/1950 | Huck |
| 2,576,786 | A | * | 11/1951 | Gray et al. .................... 408/84 |
| 2,688,185 | A | | 9/1954 | Brazil et al. |
| 2,789,597 | A | | 4/1957 | La Torre |
| 2,853,723 | A | | 9/1958 | Winslow |
| 2,994,955 | A | | 8/1961 | Dowley |
| 3,000,097 | A | | 9/1961 | Hartz |
| 3,057,246 | A | | 10/1962 | Brilmyer |
| 3,105,240 | A | * | 10/1963 | Jansson ......................... 2/420 |
| 3,620,635 | A | * | 11/1971 | DalBianco et al. ........... 408/84 |
| 3,915,053 | A | | 10/1975 | Ruhl |
| 4,246,699 | A | | 1/1981 | Van Riper |
| 4,285,126 | A | | 8/1981 | Irwin |
| 4,698,909 | A | | 10/1987 | Sleigh |
| 4,807,348 | A | | 2/1989 | Kaelin et al. |
| 4,836,062 | A | | 6/1989 | LaTorre |
| 5,315,755 | A | | 5/1994 | Fulbright et al. |
| 5,318,390 | A | * | 6/1994 | DalBianco ................... 408/84 |
| 5,548,889 | A | | 8/1996 | Smith et al. |
| 5,604,968 | A | | 2/1997 | Fulbright et al. |
| 6,092,964 | A | * | 7/2000 | El Dessouky et al. ...... 408/1 R |

* cited by examiner

*Primary Examiner*—John C. Hong
(74) *Attorney, Agent, or Firm*—Christopher Darrow, Esq.; Cynthia A. Dixon, Esq.; Greenberg Traurig LLP

(57) ABSTRACT

An improved fastener removal apparatus is configured to remove a swaged fastener of the type having an elongated threaded pin and a collar, with the collar being swaged to the pin. The fastener removal apparatus includes a nose assembly that can be mounted to an actuator of the type having a base and a translatable piston. The nose assembly includes a threaded thimble and a cutting anvil that are translatable with respect to one another. The threaded thimble is threadably connectable with the pin. The cutting anvil includes a number blades that cuttingly engage the swaged collar when the thimble is connected with the pin and translated with respect to the cuffing anvil.

7 Claims, 6 Drawing Sheets

FASTENER REMOVAL APPARATUS AND ASSOCIATED METHOD

CROSS REFERENCE TO RELATED APPLICATION

The present patent application is a divisional patent application of U.S. Ser. No. 10/654,373, filed Sep. 3, 2003, now U.S. Pat. No. 7,059,216 the disclosure of which is incorporated by reference as if fully set forth herein.

BACKGROUND OF THE INVENTION

1. Field of the Invention

The invention relates generally to fasteners and, more particularly, an apparatus for removing a fastener from another structure.

2. Description of the Related Art

Swaged fasteners and associated tooling disclosed in U.S. Pat. No. 5,315,755 to Fulbright et al. are known for use in numerous applications. An exemplary fastener of this type includes a pin and a collar, with the collar being swageable onto the pin. Specifically, the pin might include an enlarged head and a shank, with a shank having locking grooves or threading on an exterior surface thereof. The collar can be swaged into engagement with the shank, i.e., swaged into the threading, which causes the fastener to become fastened. While such fasteners have been generally effective for their intended purposes, such fasteners have not, however, been without limitation.

Such swageable fasteners have been employed widely in a variety of applications in which componentry is expensive and the fasteners often must be installed in cramped confines. A swaged fastener must be removed from the structures to which it is mounted if the fastener has been swaged improperly or if the apparatus otherwise must be disassembled. Some previously known methodologies for removing swaged fasteners have employed chisel-type devices and hammers, or alternatively have employed cutting torches, with such methodologies often resulting in breakage of the componentry to which the fastener is mounted and/or raising safety concerns and/or being relatively slow.

As is understood in the relevant art, the pin of such a fastener is significantly harder than the collar, and tooling that cuts into the pin while removing the collar therefrom will necessarily have a very short lifespan. Also, numerous known machines for removing the collars from swaged fasteners are relatively large and thus are difficult to employ within the cramped confines of a variety of applications.

It thus is desired to provide an improved apparatus for cutting a collar of a swaged fastener to facilitate removal of the swaged fastener from componentry to which it is mounted. Such an apparatus preferably would function without shock loading of the swaged fastener or the components on which the fastener is mounted, would not raise safety concerns of the type raised in conjunction with the use of cutting torches, and would operate relatively quickly. Such an apparatus preferably also would be easily used within the cramped confines in which the swaged fastener is mounted. Moreover, such an apparatus preferably would be relatively inexpensive to manufacture and employ and also would have a relatively long lifespan.

SUMMARY OF THE INVENTION

An improved fastener removal apparatus in accordance with the present invention meets these and other needs. An improved fastener removal apparatus is configured to remove a swaged fastener of the type having an elongated threaded pin and a collar, with the collar being swaged to the pin. The fastener removal apparatus includes a nose assembly that can be mounted to an actuator of the type having a base and a translatable piston. The nose assembly includes a threaded thimble and a cutting anvil that are translatable with respect to one another. The threaded thimble is threadably connectable with the pin. The cutting anvil includes a number of blades that cuttingly engage the swaged collar when the thimble is connected with the pin and translated with respect to the cutting anvil. The blades cuttingly engage the collar along a cutting direction that is generally parallel with the longitudinal extent of the pin.

An exemplary prior art swaging apparatus is depicted generally in U.S. Pat. No. 5,315,755.

An aspect of the present invention is to provide an improved fastener removal apparatus that can remove a swaged fastener from a component without damaging the component.

Another aspect of the present invention is to provide an improved fastener removal apparatus that can be operated in cramped confines in which a swaged fastener has been mounted.

Another aspect of the present invention is to provide an improved fastener removal apparatus that does not raise safety concerns of the type raised in conjunction with the use of cutting torches.

Another aspect of the present invention is to provide an improved fastener removal apparatus having a nose assembly that is mountable to an actuator of the same type as is employed in performing a swaging operation on a fastener.

Another aspect of the present invention is to provide an improved fastener removal apparatus for use with a swaged fastener of the type having a threaded pin, in which the fastener removal apparatus is threadably cooperable with the pin to facilitate removal of the fastener.

Another aspect of the present invention is to provide an improved fastener removal apparatus that can be used to remove conventional threaded fasteners, such as conventional nuts and bolts.

Another aspect of the present invention is to provide an improved fastener removal apparatus that is relatively inexpensive to manufacture and operate.

Another aspect of the present invention is to provide an improved fastener removal apparatus having a relatively long life span.

Another aspect of the present invention is to provide an improved fastener removal apparatus that operates relatively quickly.

Another aspect of the present invention is to provide an improved fastener removal apparatus for removing a swaged fastener of the type having an elongated threaded pin and a swaged collar, wherein the fastener removal apparatus includes a blade that cuttingly engages the collar along a cutting direction generally parallel with the longitudinal extent of the pin when relative translation occurs between the blade and the collar along the cutting direction.

Accordingly, an aspect of the present invention is to provide an improved nose assembly structured to be mounted to an actuator of the type having a base and a translatable piston, in which the nose assembly is structured to be cooperable with a fastener of the type having an elongated threaded pin and a collar, with the collar being affixed to the pin, and with the nose assembly being structured to cut the collar to facilitate its removal from the pin. The general nature of the nose assembly can be stated as including a threaded thimble that is structured to be mounted to one of the base and the piston, with the thimble being structured to be threadably connectable with the pin, and an anvil having a support and at least a first blade. The at least first blade is disposed on the support, and the support is structured to be mounted to the other of the base and the piston. One of the thimble and the anvil is translatable with respect to the other of the thimble and the anvil along a cutting direction generally parallel with the longitudinal extent of the pin whereby relative translation occurs between the at least first blade and the collar along the cutting direction to cuttingly engage the blade with the collar.

Another aspect of the present invention is to provide an improved combination, the general nature of which can be stated as including a fastener and a fastener release tool. The fastener includes a threaded pin and a collar, with the collar being affixed to the pin. The fastener release tool includes an actuator and a nose assembly, with the nose assembly being disposed on the actuator. The actuator includes a base and a piston, and the nose assembly includes a threaded thimble and an anvil. The thimble is disposed on one of the base and the piston, and the thimble is threadably connected with the pin. The anvil has a support and at least a first blade, with the at least first blade being disposed on the support, and with the support being disposed on the other of the base and the piston. The piston is translatable with respect to the base along a cutting direction generally parallel with the longitudinal extent of the pin to translate one of the thimble and the anvil with respect to the other of the thimble and the anvil along the cutting direction whereby relative translation occurs between the at least first blade and the collar along the cutting direction to cuttingly engage the blade with the collar.

Another aspect of the present invention is to provide an improved method of removing a collar from an elongated threaded pin, in which the general nature of the method can be stated as including providing a fastener release tool including an actuator, a threaded thimble, and an anvil, with the anvil including one or more blades, and with the thimble and the anvil being disposed on the actuator, threadably connecting together the thimble and the pin, translating with the actuator one of the thimble and the anvil with respect to the other of the thimble and the anvil along a cutting direction generally parallel with the longitudinal extent of the pin, and cuttably engaging the blades with the collar along the cutting direction to form one or more cuts in the collar.

BRIEF DESCRIPTION OF THE DRAWINGS

A further understanding of the invention can be gained from the following Description of the Preferred Embodiments when read in conjunction with the accompanying drawings in which.

Similar numeral refer to similar parts throughout the specification.

DETAILED DESCRIPTION OF PREFERRED EMBODIMENTS

The expression "thread" and variations thereof, as well as depictions, shall refer broadly to helical threading, single or multiple pitch, and shall additionally refer to other attachment formations that could include concentric grooving, knurling, and other roughening methodologies.

Figure 1:
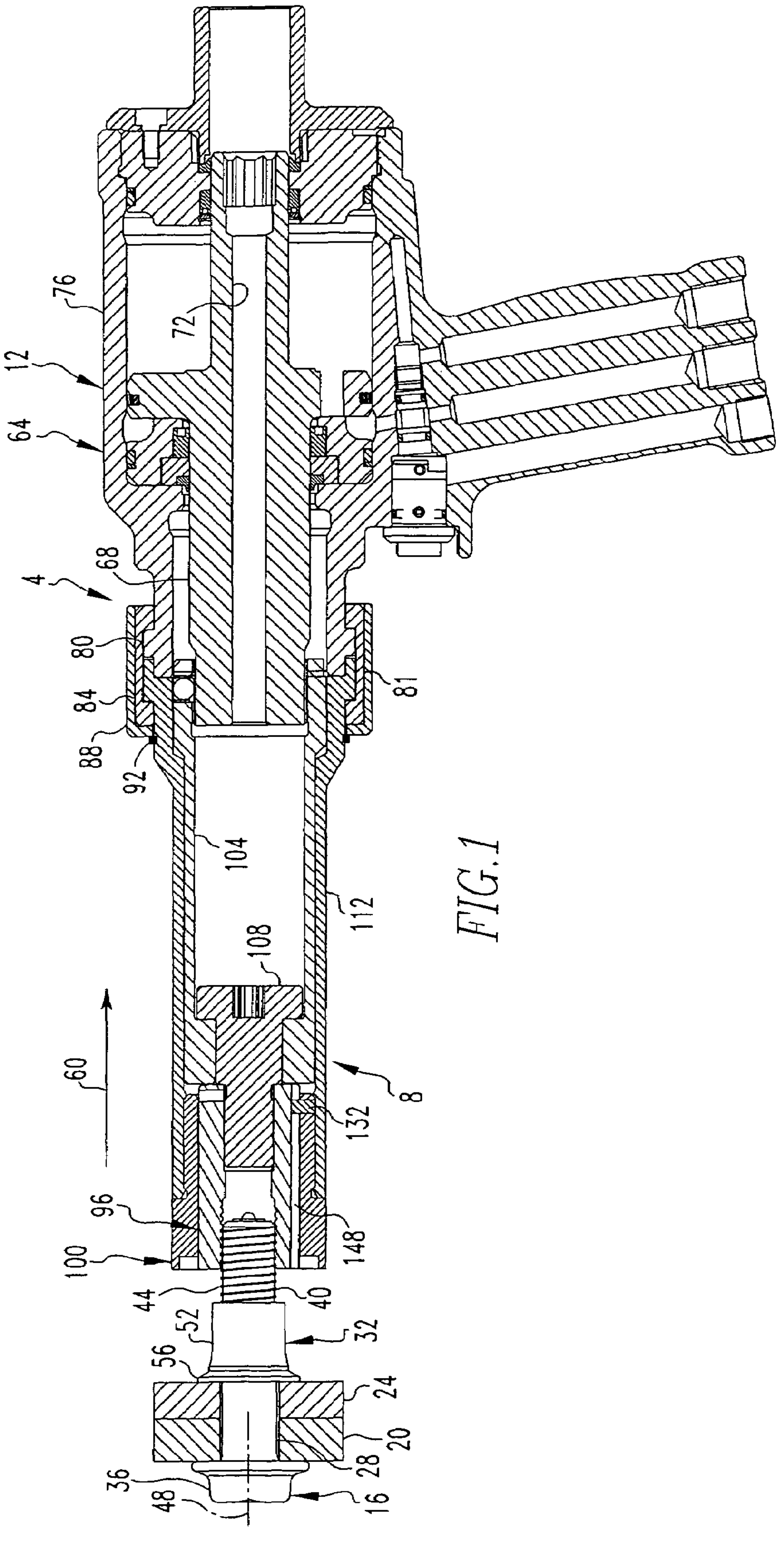
FIG. 1 is a cut away side elevational view of an improved fastener removal apparatus in accordance with a first embodiment of the present invention.
Figure 2:
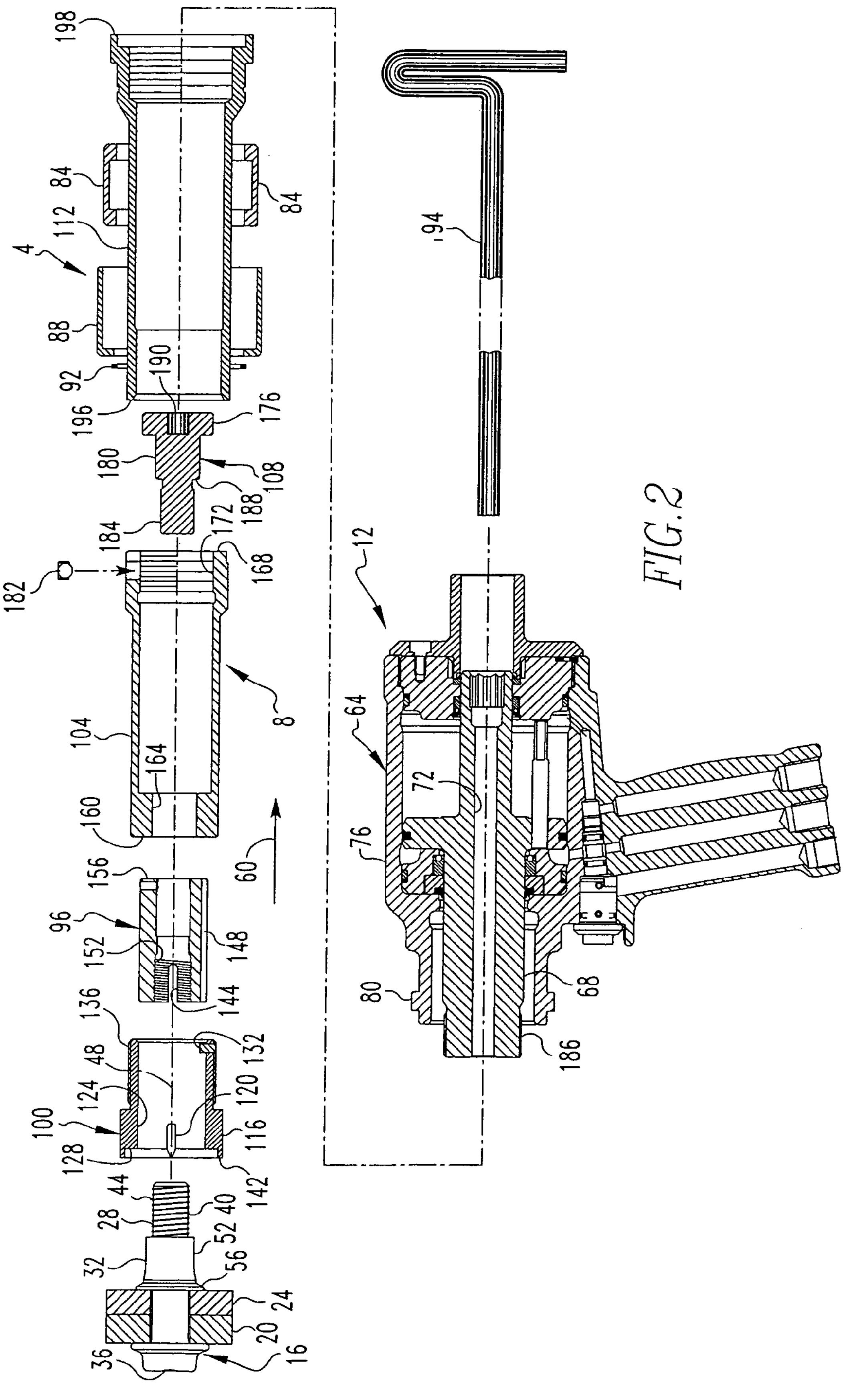
FIG. 2 is an exploded view of the apparatus of FIG. 1.
Figure 3:
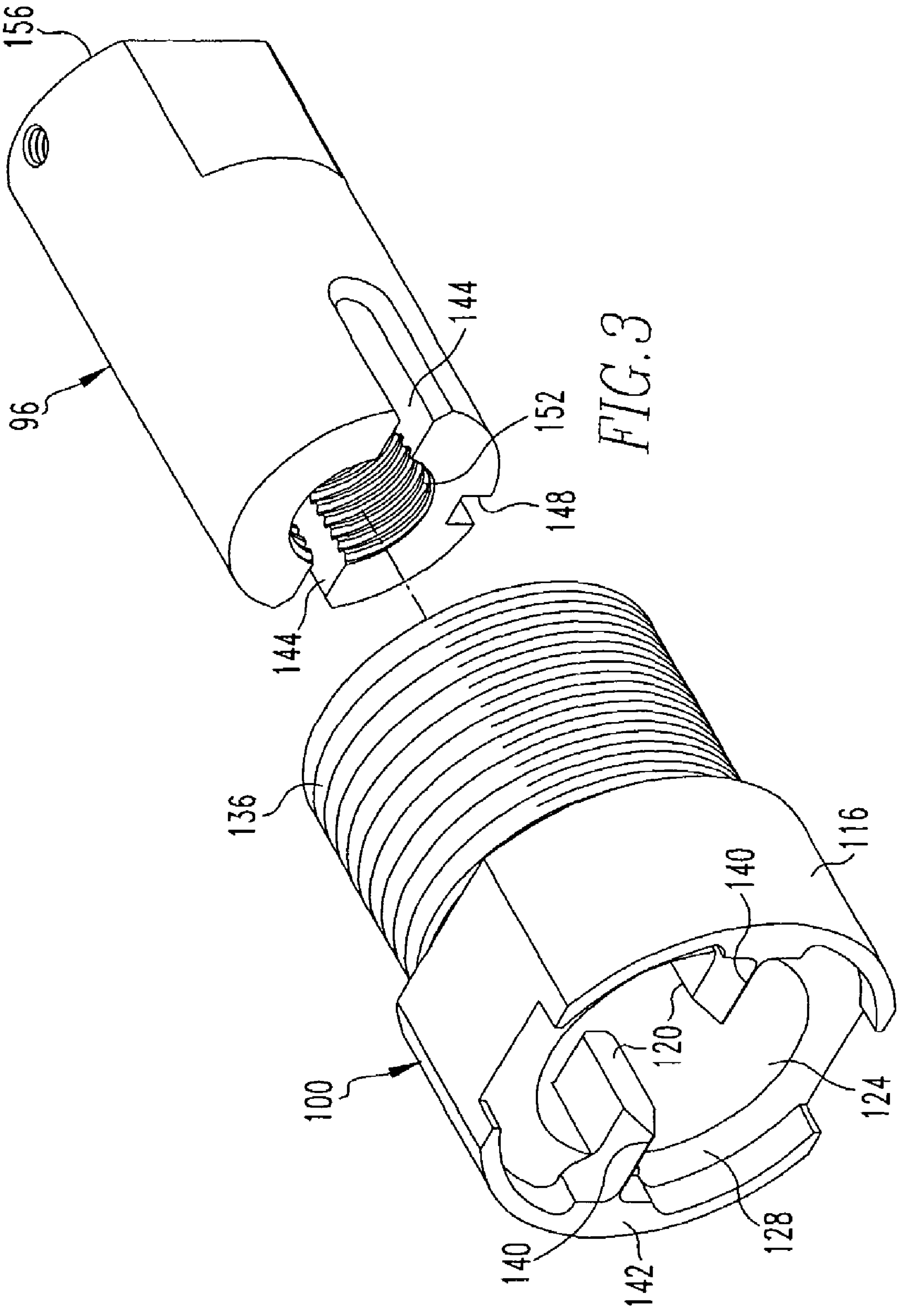
FIG. 3 is an isometric exploded view of a portion of a nose assembly of the first embodiment.
Figure 4:
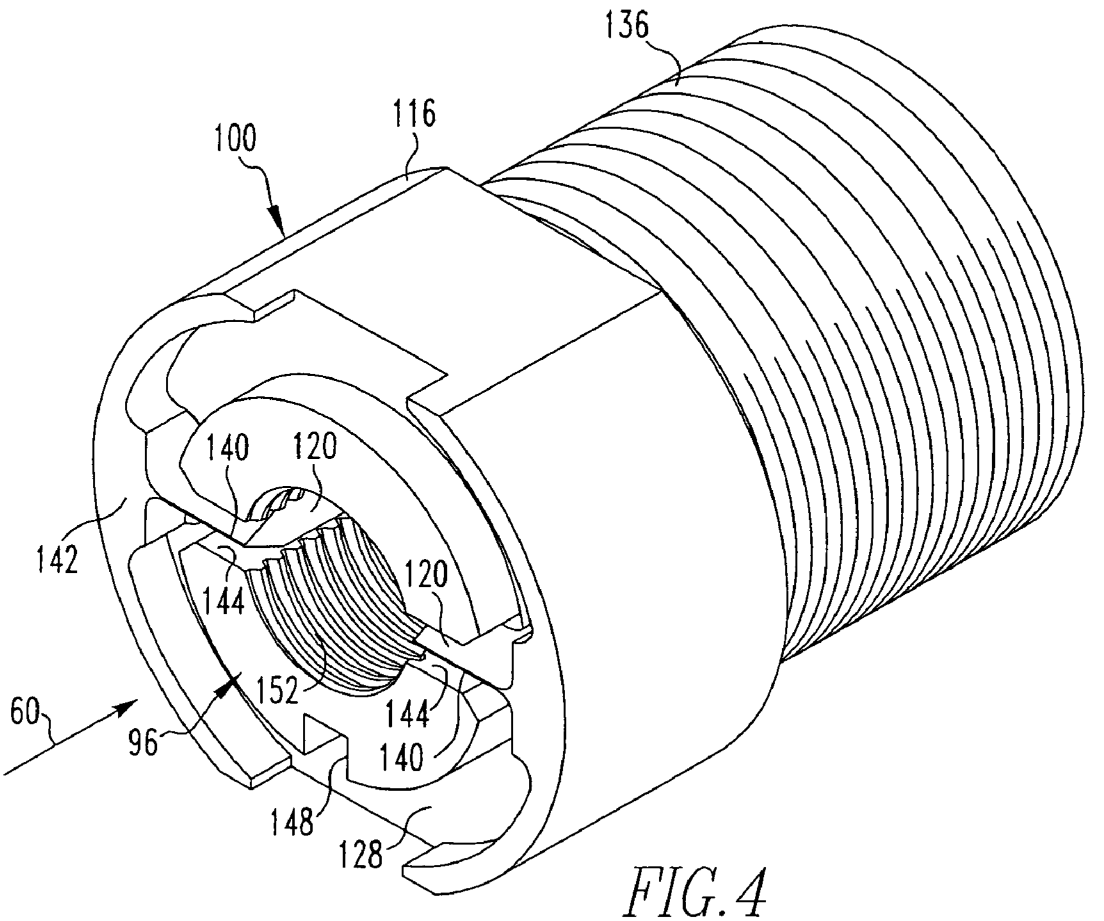
FIG. 4 is a view similar to FIG. 3, except not exploded.
Figure 5:
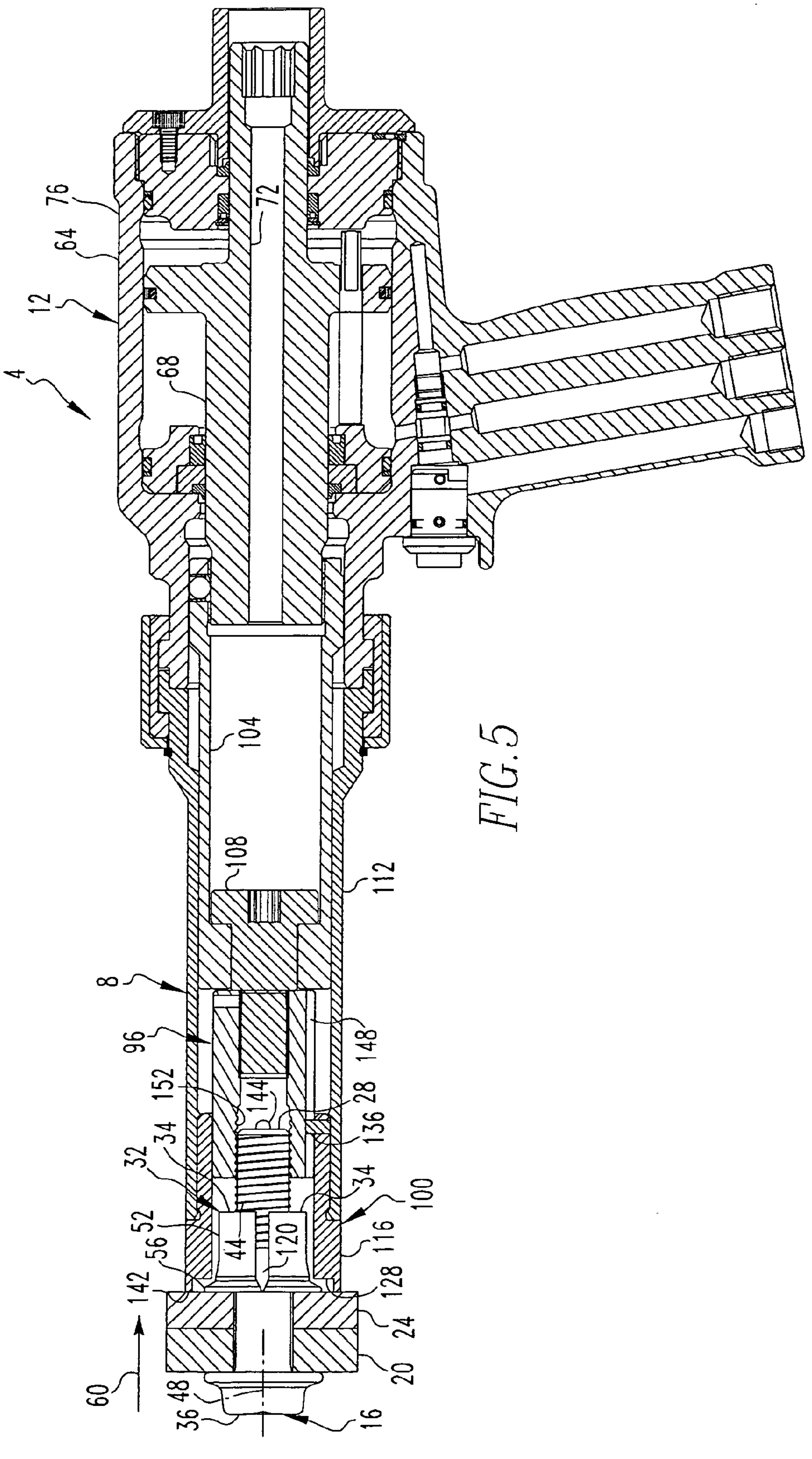
FIG. 5 is a view of the first embodiment during a cutting operation performed on a collar of a swaged fastener.

An improved fastener removal apparatus 4 in accordance with a first embodiment of the present invention is indicated generally in FIGS. 1, 2, and 5, and is depicted in part in FIGS. 3 and 4. The fastener removal apparatus 4 includes an improved nose assembly 8 and a known actuator 12. The apparatus 4 is cooperable with a swaged fastener 16 to permit removal of the fastener 16 from structures upon which it is mounted.

As can be understood from FIG. 1, the fastener 16 is any of a wide variety of swaged fasteners of the type having a pin 28 and a collar 32, with the collar 32 being swaged to the pin 28. It is particularly noted that the fastener 16 could be of other configurations, such as non-swaged configurations, which for example would include the circumstance of conventional threaded fasteners and fasteners that employ an interference fit.

The fastener 16 can be employed to fasten together structures such as, for instance, an exemplary first plate 20 and an exemplary second plate 24. The exemplary pin 28 includes an enlarged head 36 and an elongated shank 40, with the shank 40 including external shank threading 44 generally opposite the head 36, with the exemplary external shank threading being of a helical configuration. A pin axis 48 extends along the longitudinal extent of the elongated shank 40.

The collar 32 is swaged onto the shank 40 and includes a swaged region 52 and a flared region 56. While the collar 32 is shown as having a flared region 56, a generally tubular collar that does not have a flared region 56 may be used as well. The swaged region 52 is swaged into engagement with the external shank threading 44, which affixes the collar 32 to the pin 28. The flared region 56 is engaged with the second plate 24, and the head 36 is disposed against the first plate 20, whereby the first and second plates 20 and 24 are fastened together between the head 36 and the flared region 56 of the collar 32. The fastener 16 is depicted herein as being properly swaged, although it is noted that the fastener removal apparatus 4 likewise cooperates with a fastener 16 that has not been properly installed onto the first and second plates 20 and 24.

The actuator 12 can be generally described as including a base 64 and piston 68, with the piston 68 being translatable with respect to the base 64 upon operation of the actuator 12 in a known fashion. The exemplary actuator 12 is hydraulically operated, but can be of other configurations without departing from concept of the present invention. The actuator 12 includes a passageway 72 formed therein that extends into the base 64 and through the piston 68.

As shown in FIGS. 1 and 2, the base 64 includes a housing 76 having a ridge 80 formed thereon, a pair of half-rings 84, a clamp ring 88, and a snap ring 92. As can be understood from FIG. 1, and as will be described in greater detail below, a portion of the procedure in attaching the nose assembly 8 to the actuator 12 includes receiving the nose assembly 8 against the ridge 80, attaching the half-rings 84 about the region of engagement between the ridge 80 and the nose assembly 8, receiving the clamp ring 88 about the installed half-rings 84, and mounting the snap ring 92 to retain the clamp ring 88 in an attached condition. As can be appreciated, other attachment devices with different configurations could be devised for securing the nose assembly 8 to the actuator 12 or other tools.

The nose assembly 8 can be generally described as including a cutting thimble 96, a cutting anvil 100, a cutting thimble holder 104, a thimble mount 108, and a cutting anvil holder 112. The cutting thimble 96, the cutting thimble holder 104, and the thimble mount 108 are connected together and operatively connected with the piston 68. The cutting anvil 100 and the cutting anvil holder 112 are connected together and are mounted on the base 64. As will be described in greater detail below, operation of the actuator 12 translates the piston 68, and thus the cutting thimble 96, along a cutting direction represented by an arrow 60 with respect to the cutting anvil 100 to cut the collar 32 away from the pin 28.

As can be best understood from FIG. 3, the cutting anvil 100 includes an annular support 116 and a pair of blades 120. The support 116 includes a generally cylindrical interior region 124 that includes a generally annular relief region 128 at one end thereof. The relief region 128 is generally in the configuration of a counterbore, albeit with the blades 120 being disposed in such counterbore.

The exemplary nose assembly 8 is depicted herein as including a pair of the blades 120. It is noted that other embodiments may include more than two of the blades 120. Also, another embodiment could include a single blade 120 that could be employed by performing two or more separate cutting operations on the fastener 16, with the fastener 16 being rotated a partial turn between each cutting operation. The blades 120 are depicted in the exemplary embodiment as being equally circumferentially spaced from one another, but the blades could be spaced in a non-equal fashion depending upon the particular needs of the specific application.

The blades 120 are formed on the support 116, but it is understood that in other embodiments of the cutting anvil 100 the blades 120 may be removable from the support 116, such as when it might be necessary to replace the blades 120. The blades 120 each include an elongated cutting edge 140. In the exemplary embodiment of the cutting anvil 100 depicted herein, the cutting anvil 100 includes a pair of the blades 120 disposed on opposite sides of the support 116 and with the cutting edges 140 being substantially collinear. Other numbers of blades 120 may be employed without departing from the scope of the present invention, it being understood that such a collinear relationship may or may not exist in such embodiments. The blades 120 extend into the relief region 128 and the cutting edges 140 are generally coplanar with an engagement end 142 of the support 116.

As can be seen in FIGS. 1, 2, and 5, the cutting anvil 100 additionally includes a key 132 that is disposed on the support 116 and protrudes into the interior region 124. The support 116 includes a threaded portion 136 generally opposite the engagement end 142.

The cutting thimble 96 is a hollow, generally cylindrical member formed with a pair of diametrically opposed elongated grooves 144 and an elongated keyway 148. The grooves 144 extend along a portion of the longitudinal extent of the cutting thimble 96 and are configured to slidably receive the blades 120 therein. The keyway 148 is configured to slidably receive the key 132 therein, whereby the key 132 resists relative rotation between the cutting thimble 96 and the cutting anvil 100. As will be described in greater detail below, the nose assembly 8 is configured such that the cutting thimble 96 and the cutting anvil 100 are rotatable together, i.e., simultaneously, with respect to the actuator 12. The cutting thimble 96 is translatably disposed within the interior region 124 of the cutting anvil 100 with a close tolerance therebetween so that the cutting anvil 100 provides support for the cutting thimble 96, particularly in the region of the grooves 144.

The cutting thimble 96 additionally includes internal threading 152 that is configured to threadably cooperate with the external shank threading 44 of the pin 28. The cutting thimble 96 further includes a threaded attachment end 156 opposite the internal threading 152. The grooves 144 are disposed generally in the region of the internal threading 152.

The cutting thimble holder 104 is an elongated hollow member having a distal end 160 and a proximal end 168 generally opposite one another. The distal end 160 includes a substantially cylindrical axle seat 164 formed thereon. The cutting thimble holder 104 additionally includes a threaded portion 172 at the proximal end 168.

The thimble mount 108 includes a head 176, an axle portion 180, and a nipple 184. The axle portion 180 has a smooth arcuate surface, and the nipple 184 is externally threaded. The thimble mount 108 also includes a shoulder 188 extending between the axle portion 180 and the nipple 184. The head 176 includes a socket 190 formed therein that is cooperable with a tool 194. The tool 194 is receivable in the passageway 72 to engage the socket 190 and rotate the thimble mount 108 with respect to the actuator 12.

The cutting anvil holder 112 is a hollow, roughly cylindrical member having a distal end 196 and a proximal end 198 opposite one another. The distal end 196 is internally threaded to permit threaded cooperation with the threaded portion 136 of the cutting anvil 100. The proximal end 198 of the cutting anvil holder 112 is mountable to the housing 76 and is the portion of the nose assembly 8 that is disposed against the ridge 80 as discussed above.

The fastener removal apparatus 4 is assembled by receiving the axle portion 180 of the thimble mount 108 through the axle seat 164 and threadably engaging the nipple 184 with the internal threading at the attachment end 156 of the cutting thimble 96 until the attachment end 156 is tightened against the shoulder 188. The longitudinal length of the axle portion 180 is slightly longer than the longitudinal length of the axle seat 164, which permits the thimble mount 108 and the cutting thimble 96 mounted thereon to be rotated by the tool 194 with respect to the cutting thimble holder 104 and the actuator 12.

The threaded portion 172 of the cutting thimble holder 104 is threaded onto a cooperatively threaded end 186 of the piston 68. A ball 182 on the cutting thimble holder 104 is receivable in a detent on the piston 68 to resist unintended unthreading of the cutting thimble holder 104 from the piston 68.

The threaded portion 136 of the cutting anvil 100 is threadably received in the threaded distal end 196 of the cutting anvil holder 112. The cutting anvil holder 112 and the cutting anvil 100 are received over the connected-together cutting thimble 96, cutting thimble holder 104, and thimble mount 108 such that the key 132 of the cutting anvil 100 is slidably received in the keyway 148, and the blades 120 are slidably received in the grooves 144. The proximal end 198 of the cutting anvil holder 112 is received on the housing 76 adjacent the ridge 80, and the half-rings 84, clamp ring 88, and snap ring 92 are mounted in the fashion described above.

With the fastener removal apparatus 4 assembled in the described fashion, the cutting thimble 96 and the pin 28 are threadably connectable together by threadably receiving the external shank threading 44 of the pin 28 in the internal threading 152 of the cutting thimble 96. Since the first and second plates 20 and 24, and thus the fastener 16, often are substantially stationary, threading of the cutting thimble 96 onto the external shank threading 44 can be accomplished by receiving the tool 194 in the passageway 72, engaging the tool 194 in the socket 190, and rotating the tool 194 to cause rotation of the cutting thimble 96 into threaded engagement with the external shank threading 44.

With the cutting anvil holder 112 being mounted to the housing 76 in the aforementioned fashion, the cutting anvil holder 112 is rotatable with respect to the housing 76. As such, when the tool 194 is received in the socket 190, rotation of the tool 194 simultaneously causes rotation of the thimble mount 108, the cutting thimble 96, the cutting anvil 100 and the cutting anvil holder 112 with respect to the actuator 12. The key 132 received in the keyway 148, as well as the blades 120 received in the grooves 144 when in such condition, constrain the cutting anvil 100 to rotate simultaneously with the cutting thimble 96 upon operation of the tool 194.

It is preferred that the shank 40 not be threaded so far into the internal threading 152 of the cutting thimble 96 that the collar 32 engages the cutting thimble 96 since such engagement can interfere with the cutting and separation of the cut portions 34, FIG. 5, of the collar 32. In other embodiments, however, it may be desirable to achieve such engagement prior to or during cutting.

It is also noted that in alternate embodiments of the present invention (not shown) the actuator 12 can be configured to automatically rotate the cutting thimble 96 with respect to the housing 76, whereby the cutting thimble 96 can be automatically threaded onto the pin 28. In such a system, the actuator 12 may be provided with a sensing system that detects the extent to which the threaded shank 40 has been threadably received in the internal threading 152 of the cutting thimble 96 in order to cease rotation of the cutting thimble 96 upon reaching a desired amount of threaded engagement. In such an alternate embodiment the actuator 12 may additionally unthread the cutting thimble 96 from the pin 28 after the cutting operation.

Just prior to the cutting operation, the external shank threading 44 of the pin 28 is threadably connected with the internal threading 152 the cutting thimble 96, as is depicted generally in FIG. 1. The actuator 12 can then be energized, which causes the piston 68 to translate along the cutting direction 60 with respect to the base 64, which direction is to the right in FIGS. 1 and 5 with respect to the base 64. Such translation of the piston 68 likewise translates the cutting thimble holder 104, the thimble mount 108, and the cutting thimble 96 with respect to the cutting anvil 100. Such relative translation of the cutting thimble 96 pulls the shank 40 into the interior region 124 of the cutting anvil 100 and causes the blades 120 and the collar 32 to be cuttingly engaged, as is depicted generally in FIG. 5.

Translation of the fastener 16 along the cutting direction 60 with respect to the cutting anvil 100 causes the cutting edges 140 of the blades 120 to progressively cut into the collar 32 along the cutting direction 60 until the collar 32 is severed into the cut portions 34. In this regard, the piston 68 is translated until the engagement end 142 of the cutting anvil 100 engages the second plate 24 with sufficient force that the hydraulic fluid operating the actuator 12 is directed to a bypass line which ceases further advance of the piston 68. The piston 68 is then translated in an opposite direction to push the fastener 16 out of the cutting anvil 100 to permit the separate cut portions 34 of the collar 32 to fall away from the pin 28. The cutting thimble 96 can then be unthreaded from the external shank threading 44, such as manually or with the use of the tool 194, and the pin 28 can be removed from the first and second plates 20 and 24 if desired.

In performing the cutting operation, the blades 120 do not engage the pin 28 and thus are not prematurely worn. The cutting engagement of the blades 120 with the collar 32 wedges the cut portions 34 of the collar 32 away from one another and away from the pin 28 during the cutting operation. As such, the collar 32 need not be further deformed after the cutting operation to remove the cut portions 34 of the collar 32 from the pin 28, which reduces the amount of energy and effort required to remove the collar 32 from the pin 28.

Figure 6:
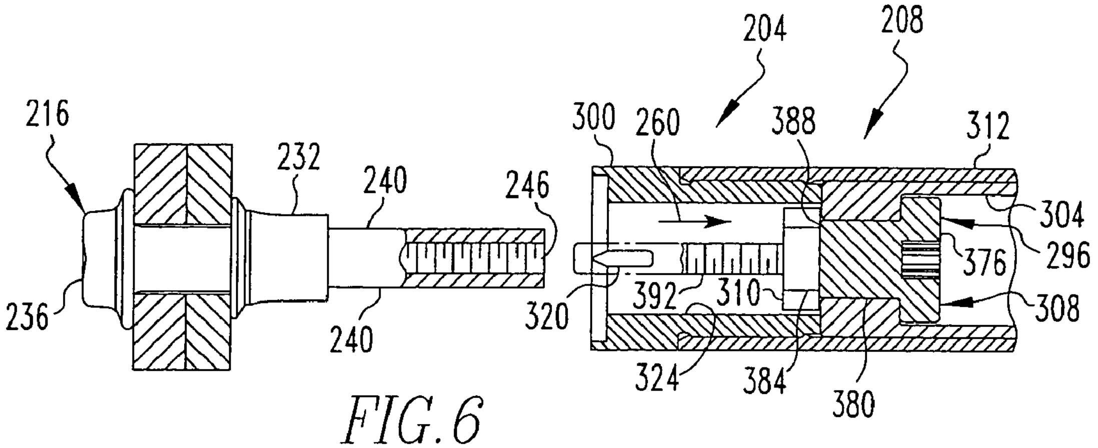
FIG. 6 is a cut away view of an improved fastener removal apparatus in accordance with a second embodiment of the present invention.

An improved fastener removal apparatus 204 in accordance with a second embodiment of the present invention is indicated generally in FIG. 6. The fastener removal apparatus 204 includes a nose assembly 208 and the actuator 12 (which is not expressly depicted in FIG. 6 of purposes of clarity). The nose assembly 208 is similar to the nose assembly 8 in that it includes the same cutting anvil 300, cutting anvil holder 312, and cutting thimble holder 304. However, the nose assembly 208 includes a cutting thimble 296 that includes a thimble mount 308 and a retention member 310. The thimble mount 308 includes a head 376, an axle portion 380, and an externally threaded nipple 384.

The retention member 310 is threadably received against a shoulder 388 of the thimble mount 308 to permit the thimble mount 308 to rotate with respect to the cutting thimble holder 304 upon application of the tool 194. The thimble mount 308 additionally includes an externally threaded stem 392 that is disposed within an interior region 324 of the cutting anvil 300. The threaded stem 392 is threadably cooperable with internal shank threading 246 on the shank 240. The internal shank threading 246 is formed on a cavity formed in the shank 240 opposite the head 236.

The threaded stem 392 is threaded into the internal shank threading 246 of the shank 240, and the actuator 12 is activated in the fashion mentioned above to translate the cutting thimble holder 304 and the thimble mount 308 along the cutting direction 260 with respect to the cutting anvil 300, which draws the shank 40 into the interior region 324 of the cutting anvil 300 and causes the blades 320 to cuttingly engage the collar 232 along the cutting direction 260 to separate the collar 232 into cut portions. The fastener removal apparatus 204 is thus configured to operate in fashion substantially similar to the fastener removal apparatus 4 albeit by cooperating with the internal shank threading 246 of the fastener 216.

It can be further understood that the teachings of the nose assembly 8 and the nose assembly 208 can be combined. Specifically, the threaded stem 392 and the internal threading 152 can be combined in a single thimble that provides threaded cooperation with a shank having both the external shank threading 44 and the internal shank threading 246. Such a thimble would provide a relatively greater degree of threaded engagement with the shank, which may be desirable depending upon the configuration of the fastener. In this regard, it is understood that an appropriately configured annular thimble having such internal threading could be substituted for the retention member 310 to provide both internal and external threading.

Figure 7:
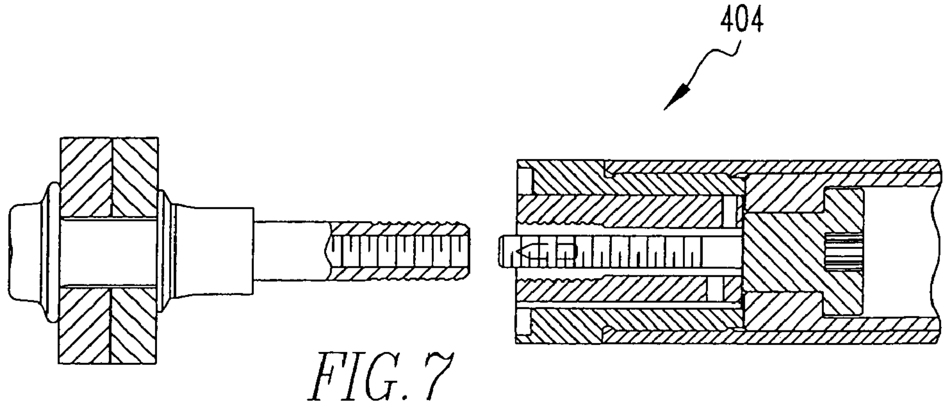
FIG. 7 is a cut away view of an improved fastener removal apparatus in accordance with a third embodiment of the present invention.

A third embodiment of a fastener removal apparatus 404 is depicted generally in FIG. 7. The fastener apparatus 404 combines the teachings of the fastener removal apparatuses 4 and 204 to provide both internal and external threaded connections with a shank of a fastener having both external and internal threading.

While the specification of this patent application is directed to use of the invention with swage-type fasteners, it should be noted that the invention could also be used to remove threaded nuts from threaded screws. As such, the collar described herein shall be understood to comprise a nut. Moreover, a condition in which a collar is affixed to or otherwise disposed on a pin shall comprised a nut threadably disposed on a threaded shank.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of removing a collar from an elongated threaded pin, the method comprising: providing a fastener release tool including an actuator, a threaded thimble, and an anvil, the anvil including one or more blades, the thimble and the anvil being disposed on the actuator; threadably connecting together the thimble and the pin; translating with the actuator the thimble with respect to the anvil or translating the anvil with respect to the thimble along a cutting direction generally parallel with the longitudinal extent of the pin; and cuttably engaging the blades with the collar along the cutting direction to form one or more cuts in the collar.

2. The method of claim 1, further comprising translating with the actuator the thimble with respect to the anvil or translating the anvil with respect to the thimble in a direction opposite the cutting direction to disengage the one or more blades from the collar.

3. The method of claim 1, further comprising unthreading the thimble and the pin from one another.

4. The method of claim 1 wherein said threadably connecting together the thimble and the pin includes threadably engaging internal threads on the thimble with external threads on the pin.

5. The method of claim 4 wherein said threadably connecting together the thimble and the pin further includes threadably engaging external threads on a threaded stem of the thimble with internal threads on the pin.

6. The method of claim 5 wherein said threadably connecting together the thimble and the pin includes threadably engaging internal threads on the thimble with external threads on the pin.

7. The method of claim 1 wherein said translating with the actuator one of the thimble and the anvil includes applying a tensile force to the thimble and to the pin in a direction generally parallel with the longitudinal extent of the pin to pull the collar into cutting engagement with the one or more blades.

* * * * *